Dec. 25, 1956     J. FRASER     2,775,258
VALVES FOR CONTROLLING THE FLOW OF LIQUIDS
Filed March 8, 1954     4 Sheets-Sheet 3
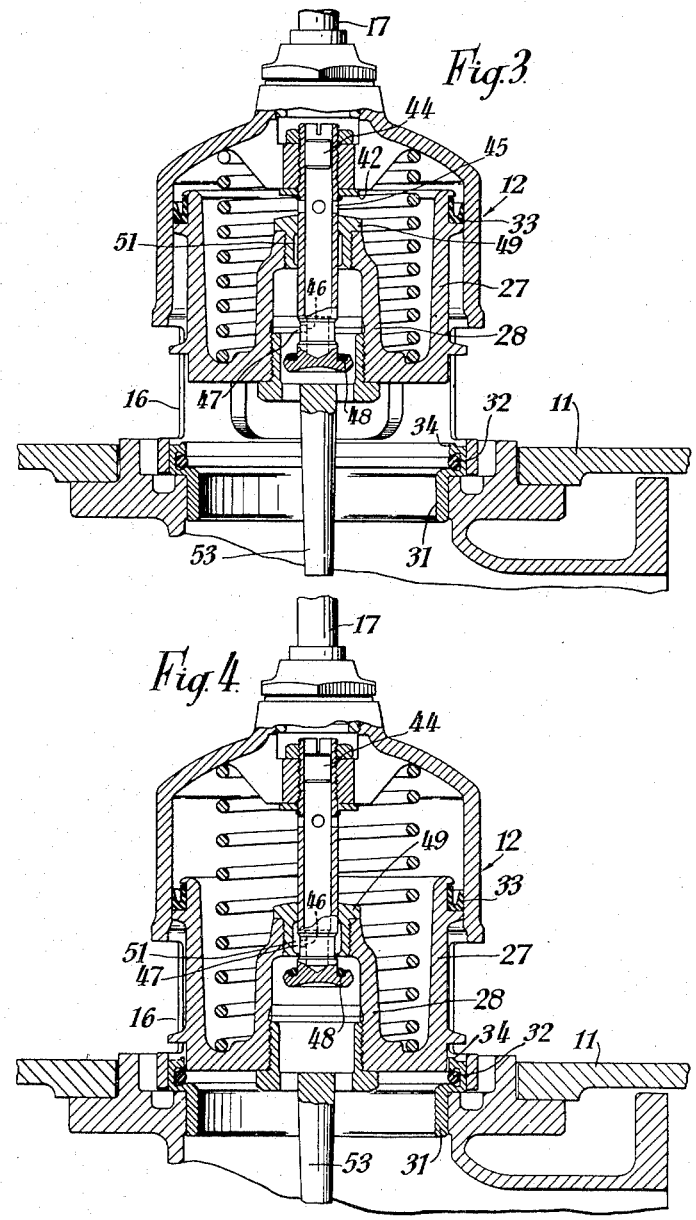
INVENTOR
JOHN FRASER
BY Dec. 25, 1956  J. FRASER  2,775,258
VALVES FOR CONTROLLING THE FLOW OF LIQUIDS
Filed March 8, 1954  4 Sheets-Sheet 4
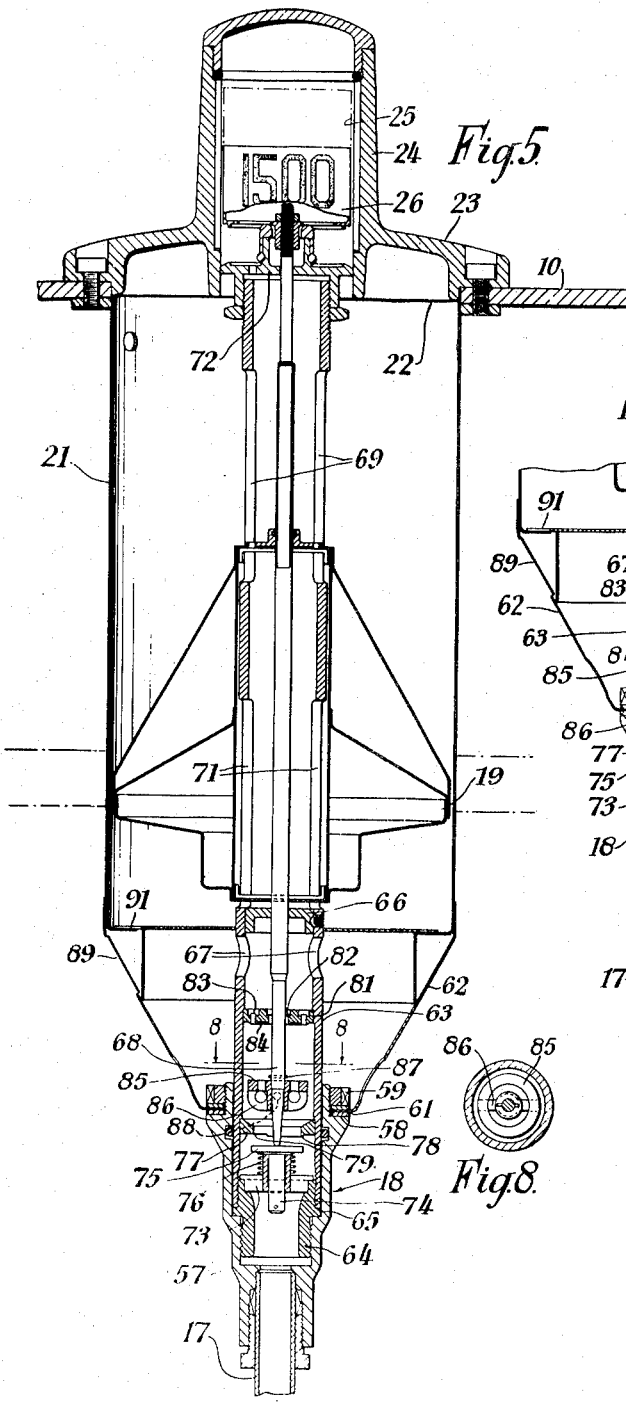
INVENTOR
JOHN FRASER
BY United States Patent Office 2,775,258
Patented Dec. 25, 1956

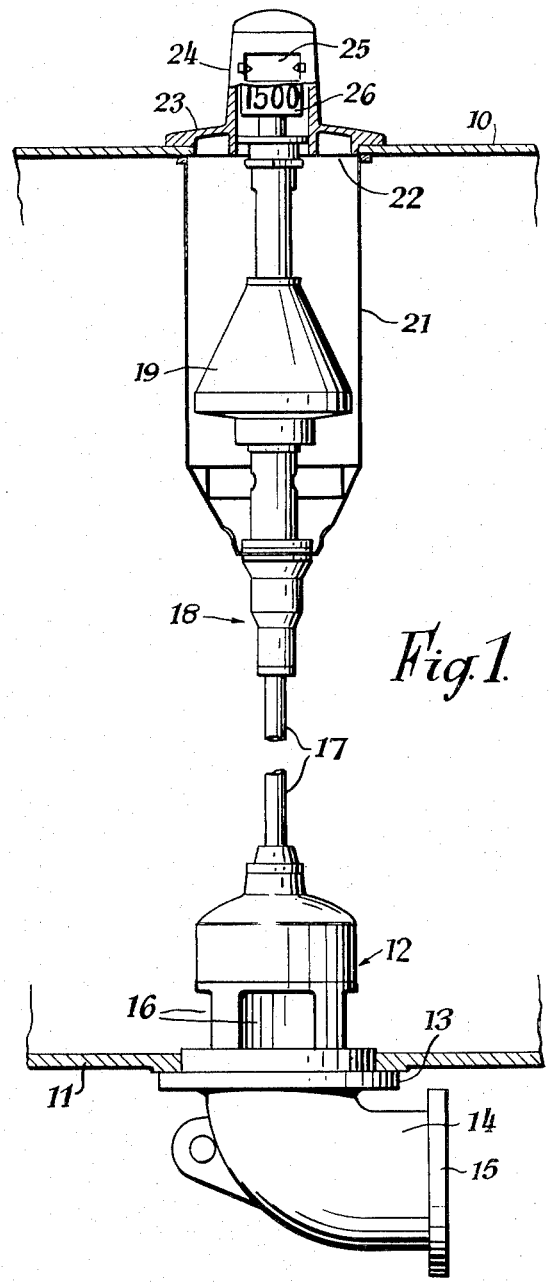

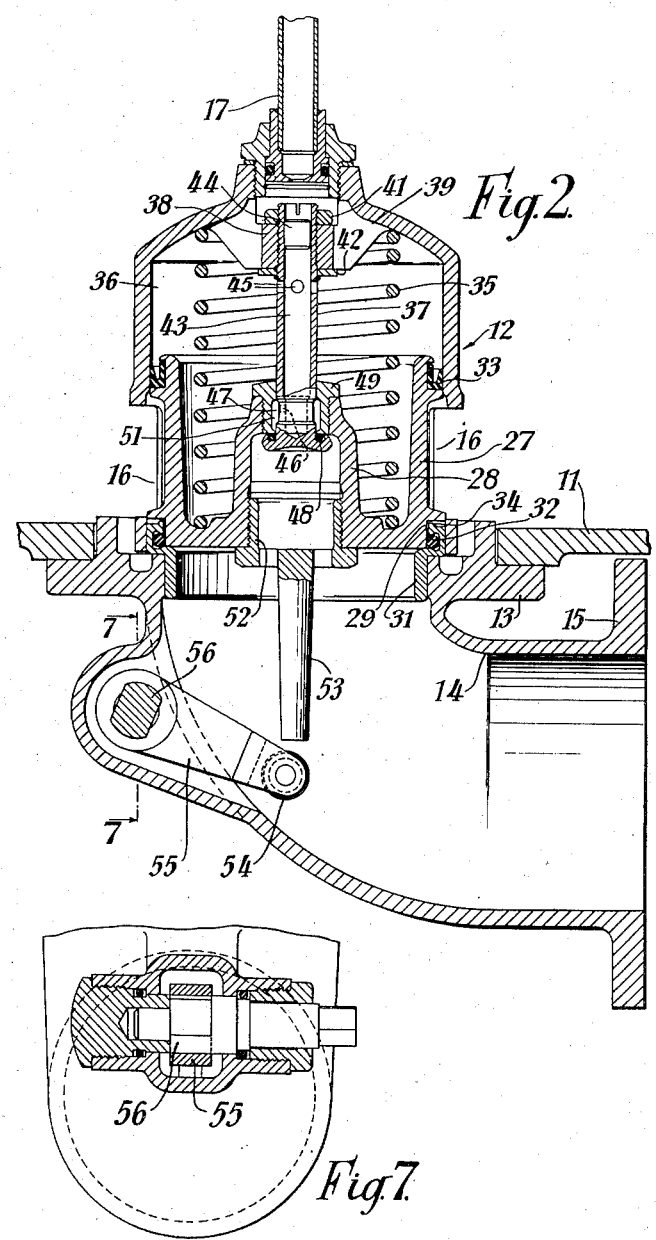

2,775,258

VALVES FOR CONTROLLING THE FLOW OF LIQUIDS

John Fraser, Tolworth, Surbiton, England, assignor to Avery-Hardoll Limited, Tolworth, Surbiton, England Application March 8, 1954, Serial No. 414,856

Claims priority, application Great Britain March 11, 1953

11 Claims. (Cl. 137—413)

This invention relates to valves for controlling the flow of liquids, and, more particularly, to valves for controlling the filling, with liquids, of tanks and like receptacles so that the supply is cut off automatically when the liquid in the receptacle reaches a predetermined level. A particular use of such a valve is in connection with the filling of tank vehicles which carry petrol and like liquid fuels for delivery to petrol stations.

The valve to which the invention relates is of the kind in which the valve closure member is displaced from its seat to open the valve by the pressure of liquid supplied to the receptacle, the closing of the valve to terminate the filling of the receptacle being effected by liquid pressure built up in a control chamber under the control of means responsive to the liquid level in the receptacle.

The object of the present invention is to provide a valve of the kind referred to in which the closing takes place in two stages, the first stage of closing producing a substantial reduction of the rate of flow of liquid into the receptacle so that the final closure can be effected abruptly without causing liquid hammer.

According to one aspect of the invention, in a valve of the kind referred to the escape of liquid from the control chamber is controlled by a float-operated relay valve closed in two stages by upward movement of a float in the tank or receptacle, and the rate of admission of liquid to the control chamber is determined by the position of the valve closure member, the first stage of closure of the relay valve causing the valve closure member to move to a position in which the inflow to the control chamber is equal to the outflow therefrom and the valve closure member is in a partially closed position.

According to another aspect of the invention, in a valve of the kind referred to, an inlet passage leading to the control chamber is open to permit a free flow of liquid into the said chamber when the valve is open, and an outlet passage from the control chamber is controlled by means responsive to the liquid level in the tank or receptacle, the liquid level responsive means acting to so restrict the outlet passage when the liquid rises to a lower predetermined level, that liquid pressure is built up in the control chamber to move the valve closure member towards the closed position, and means being provided to restrict the inlet passage as the valve closure member approaches the seat, to retard the building up of pressure in the control chamber until the liquid level responsive means, when the liquid reaches a higher predetermined level in the tank or receptacle, closes the outlet passage.

According to another aspect of the invention a valve of the kind referred to comprises, in combination, a liquid supply passage, a valve seat in said passage, a valve closure member displaced from the seat by liquid entering the tank or receptacle, a control chamber, an inlet passage leading to the control chamber, from the upstream side of the valve, an outlet passage leading from the control chamber to the downstream side of the valve, valve-position responsive means to vary the area of the inlet passage, and means responsive to the liquid level in the tank or receptacle to vary the effective area of the outlet passage, the arrangement being such that when the valve is fully open and the liquid in the tank or receptacle is below a predetermined level the relative areas of the inlet and outlet passages are such that no substantial pressure is built up in the control chamber, but upon liquid rising to a lower predetermined level in the tank or receptacle, the area of the outlet passage is reduced to effect building up of pressure in said chamber, the resulting movement of the valve causing a reduction in the area of the inlet passage which retards the building up of pressure in the control chamber, the valve closure member being thus retained in an intermediate position until the liquid in the tank or receptacle rises to a higher predetermined level and causes the liquid responsive means to close the outlet passage.

The invention is hereinafter described with reference to the accompanying drawings, in which:

Figure 1 is an elevation showing a valve according to the invention mounted in a tank;

Figure 2 is a sectional elevation, on an enlarged scale, of the valve structure with the valve in the closed position;

Figure 3 is a sectional elevation similar to Figure 2, showing the valve in the open position;

Figure 4 is a view similar to Figures 2 and 3 showing the position of the parts at the end of the first stage of closing of the valve;

Figure 5 is a sectional elevation, on the same scale as Figures 2 to 4, of the float mechanism for controlling the valve;

Figure 6 is a view corresponding to part of Figure 5 but showing the parts in a different position;

Figure 7 is a section on the line 7—7 of Figure 2; and

Figure 8 is a sectional plan on the line 8—8 of Figure 5.

Referring to Figure 1, the top and bottom walls of a tank, such as that of a tank vehicle, are indicated at 10 and 11, the body 12 of the valve being mounted on an elbow fitting 14, having a flange 13 which is bolted to the bottom wall 11 of the tank around an opening therein. The elbow 14 projects from the tank and is provided with a flange 15 to which may be bolted one half of a conduit coupling (not shown), which coupling half may include a normally closed valve opened automatically by the connection thereto of a mating coupling half. Radial ports 16 in the valve body 12 allow liquid to flow through the valve into the tank. A pipe 17 leads upwardly from the top of the valve body 12 to the lower end of a float-controlled relay valve 18 operated by a float 19 housed in a shield 21 bolted to the top wall 10 of the tank around an opening 22 in the said wall. The opening 22 is closed by a cover 23 in the centre of which is an upstanding turret 24 formed with a window 25, and an indicator 26 moving with the float rises into a position in which it is visible through the said window when the tank is full.

The valve, as shown in Figures 2, 3 and 4 includes a cup-shaped valve closure member 27 slidable vertically in the body 12 and formed with an internal hollow boss 28. The valve closure member 27 is formed at its lower end with a cylindrical portion 29 which, when the valve is closed, is engaged circumferentially by a flexible sealing ring 32 mounted in a groove in a seat ring 31 at the lower end of the body 12. The seat ring 31 is located below the ports 16, and the valve closure member carries a lipped packing ring 33 at its upper end which engages the inner surface of the body wall above the ports 16 to prevent leakage of liquid downwardly from the upper part of the body 12. The cylindrical portion 29 is of smaller diameter than the internal wall of the body which is engaged by the packing ring 33.

Above the sealing ring 32, the seat ring 31 has a cylindrical wall 34, the radius of which is such that there is only a small clearance between it and the cylindrical portion 29 of the valve closure member, and it will be seen that in all positions of the valve closure member in which its lower end is below the top of the wall 34 but above the sealing ring 32, the flow passage through the valve is of constant area. The valve closure member 27 is urged downwardly towards its seat by a spring 35. The pipe 17 communicates with the space in the upper part of the body 12, which space is hereinafter called the control chamber 36. A tubular stem 37 is fixedly mounted in the control chamber 36, being passed at its upper end through a boss 38 supported from the wall of the valve body 12 by radial arms 39, and being held in position by a nut 41 engaging the upper face of the boss, and a washer 42, located on the stem by a spring ring, engaging the lower face of the boss. The bore 43 in the stem terminates short of the lower end of the stem, and is closed at its upper end by a plug 44. Radial ports 45 in the stem, just below the boss 38, connect the bore therein to the interior of the control chamber 36, and another radial port 46 opens into a circumferential groove 47 formed on the stem adjacent its lower end. A flange at the extreme lower end of the stem is grooved on its upper surface to support a packing ring 48. The stem 37 passes through a hollow plug 49 screwed into the upper end of the boss 28, the ends of the bore through the plug 49 being of such a diameter as to provide a sliding fit on the stem 37, whilst the intermediate portion of the bore is enlarged as shown at 51.

A sleeve 52 screwed into the lower end of the boss 28 has an apertured wall at its lower end supporting a downwardly projecting stem 53 engageable by a roller 54, carried by a lever 55 mounted on a shaft 56 in the elbow 14, the shaft 56 projecting at one end to the exterior of the elbow, and having formed on its projecting end, as shown in Figure 7, a squared section to receive a key for turning the shaft.

Referring now to Figures 5 and 6, the pipe 17 leads into the lower end of a tubular fitting 57 constituting the lower part of the housing of the float-controlled relay valve 18, the upper end of the fitting 57 being formed with an upwardly facing shoulder 58 against which is clamped, by a ring 59 engaging a screw thread on the fitting 57, an inwardly directed flange 61 on a frusto-conical downward extension 62 of the shield 21. A tube 63, screwed at its lower end on to a tubular plug 64 itself screwed into the fitting 57 and located by a shoulder 65 in the said fitting, extends upwardly from the fitting 57, the bore of the tube 63 being substantially closed by a disc 66, and the tube being formed, just below the said disc, with lateral ports 67. A rod 68 passing through a hole in the disc 66 carries the float 19. The float is of annular shape, and surrounds the upper portion of the tube 63, the tube being slotted longitudinally at 69 and 71 for the passage of strap members at the top and bottom of the float, the upper strap member having a screw-threaded boss engaging a screw thread on the rod 68 to enable the position of the float on the rod to be adjusted. The upper end of the rod 68 is guided in a cap 72 mounted on the upper end of the tube 63 and carries, above the said cap 72, the indicator 26 which comprises a drum movable vertically in the turret 24. A spider 73 resting on the upper end of the tubular plug 64 is formed with a central hollow boss forming a guide for the stem 74 of a valve disc 75 urged upwardly by a spring 76 towards a seat ring 77. The seat ring 77 is formed with a downwardly projecting rim 78 on which the valve disc 75 seats, the rim 78 being notched at 79 so that the valve disc 75, when seated, does not completely close the passage through the seat ring 77. The valve disc 75 therefore acts as a flow passage restricting member. The rod 68, when the float 19 is not supported by liquid in the tank, rests on the valve disc 75, and holds it in the open position, as shown in Figure 5.

Mounted in the tube 63, between the seat ring 77 and the ports 67, is a disc 81, the disc 81 being a press fit in the tube 63 and being located by a shoulder in the said tube. The disc 81 is formed with a central aperture 82 providing a substantial clearance around the rod 68, and with a circumferential ring of openings 83, the lower surface of the disc being grooved at 84 between the aperture 82 and the openings 83. The rod 68 carries, between the disc 81 and the seat ring 77, a closure member 85 adapted to co-operate with the disc 81 when the float 19 rises, the closure member, which is shown in plan in Figure 8, comprising inner and outer rings connected on their underside by radial ribs 86. The closure member 85 is supported on the rod 68 between two diametral pins 87 and 88 arranged at right angles one to the other, so that the said member is free for slight universal tilting movement on the rod.

When the valve disc 75 is in the position shown in Figure 5 the liquid flows freely past the disc 75 and through the apertures 82 and 83 in the disc 81, but when the valve disc 75 has moved to the position shown in Figure 6, the rate of flow is determined by the size of the notch 79 until the closure member 85 engages the disc 81, when the flow is completely stopped.

When the tank is empty, the float 19 will be in its lowermost position, as shown in Figure 5, and the valve disc 75 will be spaced from the seat ring 77 as shown in that figure. The closure member 85 is then spaced from the disc 81 by a distance greater than the travel of the valve disc 75. The indicator drum 26 is wholly below the window 25 in the turret 24. The portion 29 of the valve closure member 27 is engaged by the packing ring 32 in the seat ring 31, and the lower end of the hollow plug 49 rests on the packing ring 48.

To fill the tank, a liquid supply is connected to the elbow 14, and the entering liquid lifts the valve closure member 27 upwardly to the position shown in Figure 3, so that the said liquid can pass upwardly through the seat ring 31 and outwardly through the ports 16 into the tank. Liquid also passes through the port 46 in the tubular stem 37, which port is now open to the underside of the valve closure member, and this liquid flows through the ports 45 into the control chamber 36, up the pipe 17 and through the float-controlled relay valve 18 into the tank. The area of the port 46 is so related to the total area of the apertures 82 and 83 in the disc 81 that no pressure is built up in the control chamber 36. As the liquid rises in the tank and approaches the desired level, it enters the shield 21 through openings 89 in the extension 62 and openings 91 in the bottom of the shield itself, and lifts the float 19, a short upward movement of which allows the valve disc 75 to seat on the rim 78 of the seat ring 77 as shown in Figure 6, thus reducing the flow passage through the float-controlled relay valve to such an extent that pressure builds up in the control chamber 36, until, acting with the assistance of the spring 35 on the upper side of the valve closure member, it overcomes the upward thrust on the said member due to the entering liquid. The valve closure member is therefore urged downwardly until the lower end of the hollow plug 49 approaches the lower edge of the groove 47 in the stem 37, in which position it is shown in Figure 4, the flow of liquid into the control chamber 36 being thus restricted until a state of equilibrium between the inflow to and the outflow from the control chamber 36 is achieved, and the valve ceases to move towards the closed position. The valve closure member 27 is now positioned with the lower end of its cylindrical portion 29 overlapping the cylindrical wall 34 of the seat ring 31, as shown in Figure 4, so that the rate of flow of liquid into the tank is greatly reduced. Liquid continues to enter the tank slowly, and continues to lift the float 19 until the closure member 85 engages the underside of the disc 81 and substantially completely shuts off the escape of liquid from the control chamber 36. Pressure therefore builds up in the control chamber to complete the movement of the valve closure member to its closed position, in which the cylindrical portion 29 is engaged by the packing ring 32, and the lower end of the hollow plug 49 is in engagement with the packing ring 48, so that the flow of liquid into the tank is completely stopped. The formation of the valve closure member 85 as two spaced rings each closing an aperture or group of apertures in the disc 81 results in very little upward thrust being exerted by the liquid on the said closure member as it approaches its seat, and ensures that the final closing is dependent on the liquid level in the tank.

When the rod 68 has completed its upward movement, the indicator 26 is directly opposite the window 25, the indicator being marked with figures indicating the quantity of liquid then contained in the tank.

The valve closure member 27 may be lifted to allow the outflow of liquid from the tank by rocking the arm 55 to engage and press upwardly on the stem 53.

The closing of the valve in two stages makes it possible to supply liquid to the tank at a high speed when the valve is fully open. The first stage of closing takes place gradually, due to the progressive building up of pressure in the control chamber, so that there is no abrupt change of rate of flow during that stage of closing, and the flow is so restricted between the first and second stages of closing that an abrupt final closure does not produce hammer. The slow entry of liquid between the two stages of closing allows the liquid in the tank to settle down to a level surface, so that the final closure is accurately controlled and there is very little error in the quantity of liquid in the tank.

I claim:

1. A valve for controlling the filling of a tank with liquid, comprising a body defining a liquid supply passage, a valve seat in said body surrounding said passage, a valve closure member in said body for cooperation with said seat and displaceable from the seat by supply liquid entering the tank through said liquid supply passage, said body and valve closure member jointly defining a control chamber, means defining an inlet passage leading to the control chamber from the upstream side of said valve closure member, means defining an outlet passage leading from the control chamber to the tank, auxiliary valve means movable between open position permitting maximum flow through said outlet passage and closed position establishing a reduced flow through said outlet passage so that when said auxiliary valve means is in open position, pressure is relieved from said control chamber and said valve closure member is fully opened by supply liquid pressure thereon but when said auxiliary valve means is closed, pressure is increased in said control chamber to move said valve closure member toward closed position in which flow through said inlet passage to said control chamber is reduced and the supply liquid pressure holds said valve closure member in a partially open position, control valve means to shut off said outlet passage and prevent escape of liquid from the control chamber to thereby cause the valve closure member to engage said valve seat to stop the flow of supply liquid through said liquid supply passage to the tank, and means responsive to the liquid level in the tank for operating the auxiliary valve means when the liquid in the tank reaches a lower predetermined level and also for operating said control valve means when the liquid in the tank reaches a higher predetermined level.

2. A valve for controlling the filling of a tank with liquid, comprising a body defining a liquid supply passage, a valve seat in said body surrounding said passage, a valve closure member in said body for cooperation with said seat and displaceable from the seat by supply liquid entering the tank through said liquid supply passage, said body and valve closure member jointly defining a control chamber, means defining an inlet passage leading to the control chamber from the upstream side of said valve closure member, means defining an outlet passage leading from the control chamber to the tank, valve position responsive means for varying the area of the inlet passage, auxiliary valve means movable between open position permitting maximum flow through said outlet passage so that when said auxiliary valve means is in open position pressure is relieved from said control chamber and said valve closure member is fully opened by supply liquid pressure thereon but when said auxiliary valve means is closed, pressure in said control chamber is increased to move said valve closure member toward closed position and into cooperation with said valve position responsive means to reduce flow through said inlet passage to said control chamber so that the supply liquid pressure holds said valve closure member in a partially open position, control valve means to shut off said outlet passage and prevent escape of liquid from the control chamber to thereby cause the valve closure member to engage said valve seat to stop the flow of supply liquid through said liquid supply passage to the tank, and means responsive to the liquid level in the tank for operating the auxiliary valve means when the liquid in the tank reaches a lower predetermined level and also for operating said control valve means when the liquid in the tank reaches a higher predetermined level.

3. The combination of a liquid receptacle and a valve device controlling the flow of supply liquid into said receptacle, said valve device comprising a valve body located in said receptacle, a valve seat in said body surrounding an inlet opening in the bottom wall of the receptacle, a main valve member in said body and cooperative with said valve seat to close said inlet opening, said valve body defining a control chamber in communication with the receptacle and into which the main valve member moves as the valve device opens, means defining an inlet passage connecting the control chamber to the upstream side of the main valve member when the valve device is open, auxiliary valve means controlling the escape of liquid from the control chamber to the receptacle and including a flow restricting member and a flow closure member, and float means responsive to the level of liquid in the receptacle to operate said flow restricting member so as to reduce the rate of escape of liquid from the control chamber when the liquid reaches a lower predetermined level and thereby increasing pressure in said control chamber to move said main valve member toward closed position in which flow through said inlet passage to said control chamber is reduced and the pressure of supply liquid through said inlet opening holds said main valve member in a partially open position, said flow closure member being operated by said float means when the level of the liquid in the receptacle reaches a higher predetermined level to completely stop the flow of liquid from the control chamber into the receptacle thereby building up pressure in the control chamber to complete the movement of the main valve member to its closed position and completely stop the flow of supply liquid through said inlet opening into the receptacle.

4. The combination of a tank and a valve for controlling the flow of supply liquid into said tank, said valve comprising a liquid supply passage means located in said tank, a valve seat in said passage means, a main valve member in said passage means and displaceable from the seat by supply liquid entering the tank through said passage means, said passage means and main valve member jointly defining a control chamber on the downstream side of said main valve member, means defining an inlet passage leading to the control chamber from the upstream side of the valve, means defining an outlet passage from the control chamber to the tank, valve-position responsive means to vary the area of the inlet passage, and means responsive to the liquid level in the tank to vary the effective area of the outlet passage so that when the valve is fully open and the liquid in the tank is below a predetermined level, the relative areas of the inlet and outlet passages are such that no substantial pressure is built up in the control chamber but upon liquid rising to said predetermined level in the tank, the area of the outlet passage is first reduced to increase pressure in said control chamber and move said main valve member toward closed position and into cooperation with said valve-position responsive means to reduce flow through said inlet passage to said control chamber and supply liquid pressure in said passage means holds said main valve closure member in a partially open position, said liquid level responsive means then being operated to close said outlet passage and build up pressure in said control chamber to move said main valve member to closed position and completely stop flow of supply liquid through said passage means into said tank, said latter means including float means and two valve elements in said outlet passage to control the escape of liquid from the control chamber in two stages, said elements being operated by said float means in series so that as the liquid level rises, one valve element is first seated to reduce the escape of liquid and the other valve element is subsequently seated to cut off the escape of liquid completely.

5. A valve for controlling the filling of a tank with liquid, comprising liquid supply passage means, a valve seat in said passage means, a main valve member in said passage means and displaceable from the seat by liquid entering the tank through the valve, said passage means defining a control chamber on the downstream side of said main valve member, means defining an inlet passage leading to the control chamber from the upstream side of said main valve member, means defining an outlet passage leading from the control chamber to the tank, a float in the tank, and relay valve means operated by said float to be closed in two successive stages by upward movement of the float in the tank, the first stage of closure of the relay valve means causing the main valve member to move toward closed position until the flow through said inlet passage to the control chamber is reduced so that the supply liquid pressure holds the main valve member in a partially open position, and the second stage of closure of the relay valve means causes the liquid pressure to be built up in the control chamber to move the main valve member to completely closed position.

6. A valve for controlling the filling of a tank with liquid, comprising liquid supply passage means, a valve seat in said passage means, a main valve member in said passage means and displaceable from the seat by liquid entering the tank through the valve, said passage means defining a control chamber on the downstream side of said main valve member, means defining an inlet passage leading to the control chamber from the upstream side of said main valve member, means defining an outlet passage leading from the control chamber to the tank, a float in the tank, and relay valve means operated by said float to be closed in two successive stages by upward movement of the float in the tank, the first stage of closure of the relay valve means causing the main valve member to move toward closed position until the flow through said inlet passage to the control chamber is reduced so that the supply liquid pressure holds the main valve member in a partially open position, and the second stage of closure of the relay valve means causes the liquid pressure to be built up in the control chamber to move the main valve member to completely closed position, said relay valve means comprising a ring seat provided with a by-pass opening and a spring urged valve element to engage said ring seat and partially close the passage of liquid through the seat ring.

7. A control valve as set forth in claim 6, comprising a rod carried by said float and pressing on the valve element of the relay valve means against the pressure of the spring in said relay valve means to keep said relay valve means open when the level of the liquid in the tank is below a predetermined level.

8. A control valve as set forth in claim 7, wherein said relay valve means comprises a perforated disc forming a seat, and a closure member carried by said float and responsive to a rise in the level of the liquid in the tank to engage the perforated disc to completely stop the flow of liquid from the control chamber into the tank, thereby building up a pressure in the control chamber to complete the movement of the main valve member to completely stop the flow of liquid into the tank.

9. A valve for controlling the filling of a tank with liquid, comprising a body defining a liquid supply passage, a valve seat in said body surrounding said passage, a main valve member in said body and displaceable from the seat by liquid entering the tank, said body defining a control chamber on the downstream side of said main valve member, an inlet passage means leading to the control chamber from the upstream side of the valve, an outlet passage means leading from the control chamber to the tank, auxiliary valve means to control the escape of liquid from said control chamber through said outlet passage means and including valve seat means in said outlet passage means and a valve element spring biased toward said valve seat means, means responsive to the liquid level in the tank to operate the auxiliary valve means to vary the effective area of the outlet passage so that when the valve is fully open and the liquid in the tank is below a predetermined level, the relative areas of the inlet and outlet passages prevent the development of any substantial pressure in the control chamber but upon liquid rising to said predetermined level in the tank said auxiliary valve means is operated to reduce the area of the outlet passage and build up pressure in the control chamber to move said main valve member toward closed position in which flow through said inlet passage to said control chamber is reduced and the pressure of liquid through said supply passage holds said main valve member in a partially open position, and float operated valve means to shut off escape of liquid from the control chamber through said outlet passage and cause the main valve member to engage said valve seat to stop the flow of liquid through said supply passage to the tank.

10. A valve for controlling the filling of a tank with liquid, comprising means defining a liquid supply passage and including a valve seat surrounding said passage, a main valve member displaceable from the seat by liquid entering the tank through the supply passage, said means defining a control chamber on the downstream side of said main valve member, means defining an inlet passage leading to the control chamber from the upstream side of the valve, means defining an outlet passage leading from the control chamber to the tank, float means in the tank, and relay valve means operated by said float means to be closed in two stages by upward movement of the float means in the tank, the first stage of closure of the relay valve means causing the main valve member to move toward closed position until the flow through said inlet passage to the control chamber is reduced so that supply liquid pressure holds the main valve member in a partially open position, and the second stage of closure of the relay valve means causes the liquid pressure to be built up in the control chamber to move the main valve member to closed position engaging said seat, said relay valve means including a valve element spring biased toward closed position and opened by said float means when the liquid level in the tank is below a predetermined level.

11. A valve for controlling the flow of supply liquid into a tank, said valve comprising liquid supply passage means, a valve seat in said passage means, a main valve member in said passage means and displaceable from the seat by supply liquid entering the tank through said passage means, said passage means and main valve member jointly defining a control chamber on the downstream side of said main valve member, means defining an inlet passage leading to the control chamber from the upstream side of the valve, means defining an outlet passage from the control chamber to the tank, valve-position responsive means to vary the area of the inlet passage, and means responsive to the liquid level in the tank to vary the effective area of the outlet passage so that when the valve is fully open and the liquid in the tank is below a predetermined level, the relative areas of the inlet and outlet passages are such that no substantial pressure is built up in the control chamber but upon liquid rising to said predetermined level in the tank, the area of the outlet passage is first reduced to increase pressure in said control chamber and move said main valve member toward closed position and into cooperation with said valve-position responsive means to reduce flow through said inlet passage to said control chamber and supply liquid pressure in said passage means holds said main valve closure member in a partially open position, said liquid level responsive means then being operated to close said outlet passage and build up pressure in said control chamber to move said main valve member to closed position and completely stop flow of supply liquid through said passage means into said tank, said latter means including float means and two valve elements in said outlet passage to control the escape of liquid from the control chamber in two stages, said elements being operated by said float means in series so that as the liquid level rises, one valve element is first seated to reduce the escape of liquid and the other valve element is subsequently seated to cut off the escape of liquid completely, one of said valve elements being spring biased toward closed position and opened by said float means when the liquid level in the tank is below a predetermined level.

References Cited in the file of this patent

UNITED STATES PATENTS

| | | |
|---|---|---|
| 2,491,521 | Samiran | Dec. 20, 1949 |
| 2,528,499 | Davies | Nov. 7, 1950 |
| 2,699,316 | Mosher | Jan. 11, 1955 |